May 3, 1927.

W. L. FISH

CARD CAMERA

Filed Sept. 19, 1925   3 Sheets-Sheet 1

1,626,606

William L. Fish, Inventor:
Everett + Rook
By Attorneys.

May 3, 1927.
W. L. FISH
CARD CAMERA
Filed Sept. 19, 1925    3 Sheets-Sheet 2
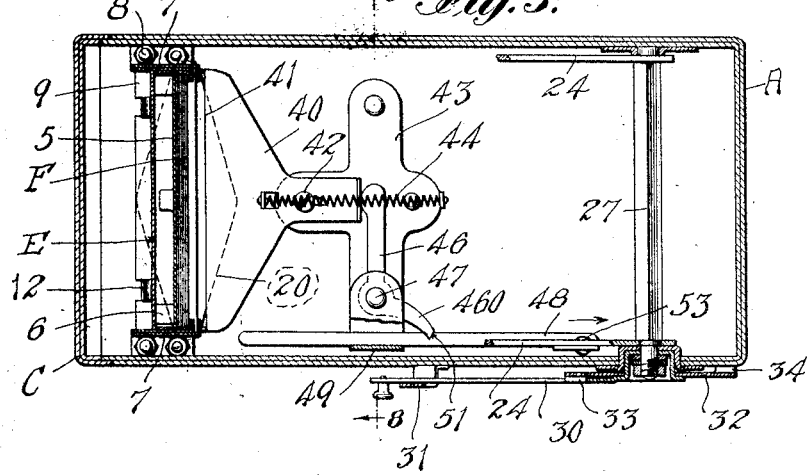
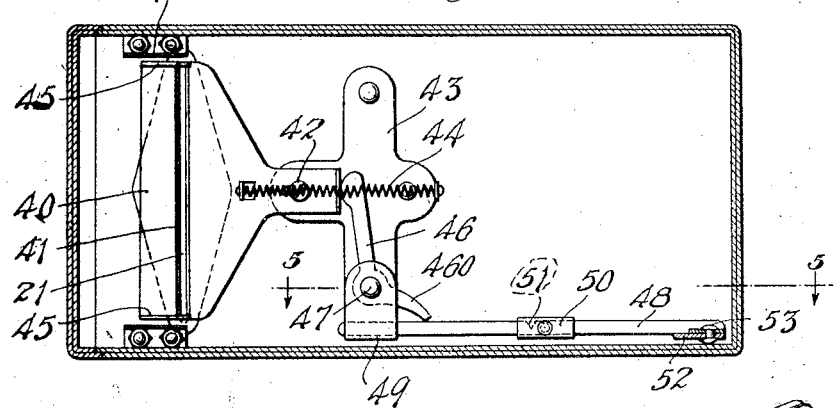
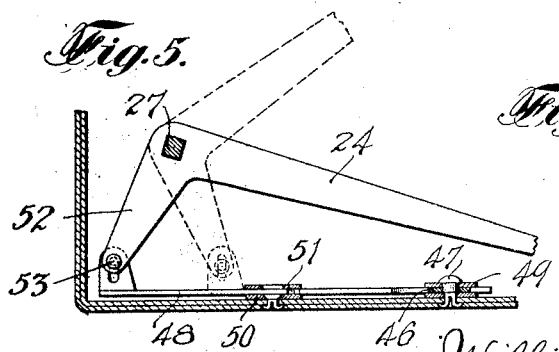
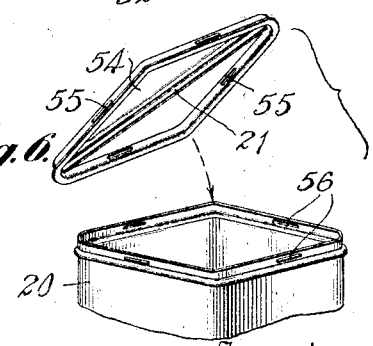
Inventor:
William L. Fish,
By Everett & Rook,
Attorneys.

May 3, 1927.
W. L. FISH
CARD CAMERA
Filed Sept. 19, 1925 3 Sheets-Sheet 3
1,626,606
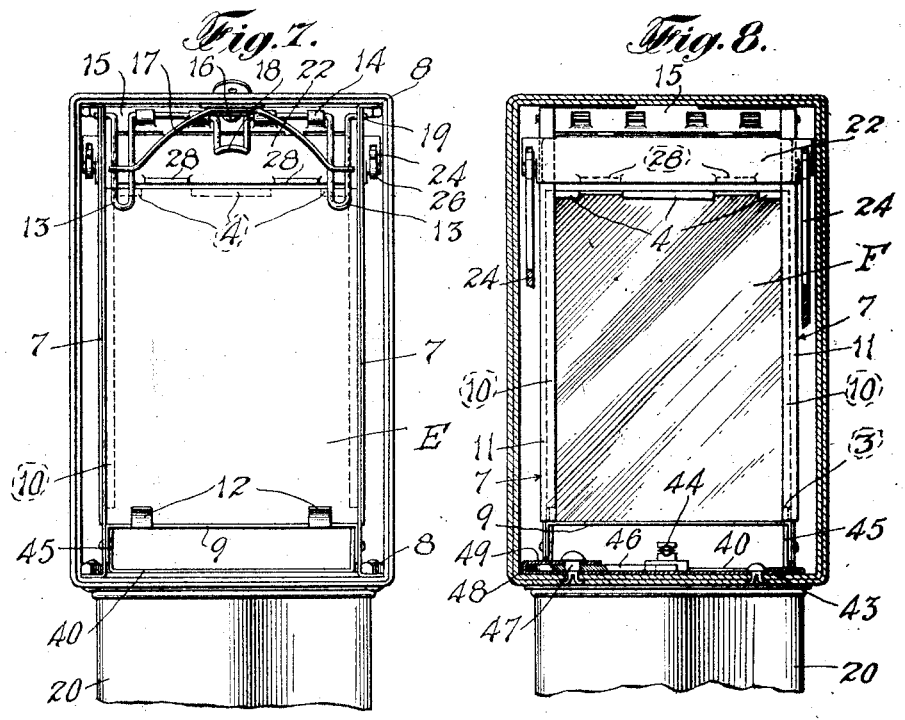
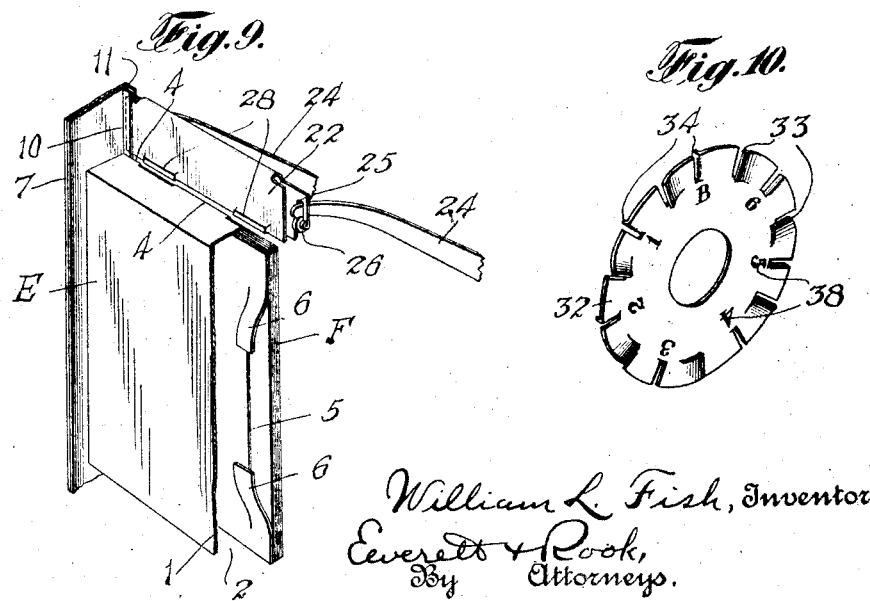
William L. Fish, Inventor:
Everett & Rook,
By Attorneys.

Patented May 3, 1927.

1,626,606

UNITED STATES PATENT OFFICE.

WILLIAM LAFAYETTE FISH, OF POMPTON PLAINS, NEW JERSEY.

CARD CAMERA.

Application filed September 19, 1925. Serial No. 57,352.

This invention relates particularly to that type of camera which may be loaded with a pack or plurality of sensitized cards or films in daylight and which is provided with means for substantially instantaneously developing the cards or films after exposure thereof and at the place of the exposure.

One object of the invention is to provide a holder or case for a plurality of sensitized cards or films, whereby the pack of cards or films may be inserted into the camera in daylight without the use of a fabric sleeve which is common in the art and attached to the camera for insertion of the arm of the operator to exclude light from the camera while the film pack is being inserted into the camera.

Another object is to provide a camera of the general character described including novel and improved means for ejecting the cards or films separately from the pack after exposure and into a developing tank.

A further object is to provide a camera embodying a novel and improved combination of a holder for a plurality or pack of sensitized cards or films, a developing tank for developing the cards or films after exposure thereof, and means for ejecting the cards or films from the holder one at a time after each exposure and directly into the said developing tank, whereby each card or film may be removed from the pack and deposited in the developing receptacle and an unexposed card or film positioned in proper relation to the lens of the camera in one and the same operation and without opening the camera.

Other objects are to provide such a camera including a casing to which is removably attached a developing tank having a card or film receiving opening and which is provided with a card or film holder which disposes the cards edgewise in alinement with the receiving opening of the tank, with means for moving the card or film edgewise from the holder through the receiving opening of the tank; to provide novel and improved means for automatically opening and closing the receiving opening of the developing tank to receive a card or film after exposure, and to normally prevent entrance of light into the camera casing; to provide novel and improved means for indicating the number of cards or films which have been exposed; to provide a camera of the character described embodying novel and improved details of construction whereby the camera is simple and inexpensive, and easy to operate, and to obtain other results and advantages as may be brought out by the following description.

Referring to the accompanying drawing, in which the same reference characters designate corresponding and like parts throughout the several views, Figure 1 is a side elevation of a card camera embodying the invention;

Figure 3 is a horizontal sectional view, taken on the line 3—3 of Figure 2;

Figure 4 is a similar view, taken on the line 4—4 of Figure 2;

Figure 5 is a fragmentary longitudinal vertical sectional view, taken on the line 5—5 of Figure 4;

Figure 6 is a composite fragmentary perspective view of the developing tank and its cover;

Figure 7 is a rear elevation of the camera with the cover removed to show the card or film holder;

Figure 8 is a transverse vertical sectional view, taken on the line 8—8 of Figure 3;

Figure 9 is a fragmentary perspective view of the card holder and card ejector, and Figure 10 is a detached perspective view of the card-counting dial.

Figure 1:
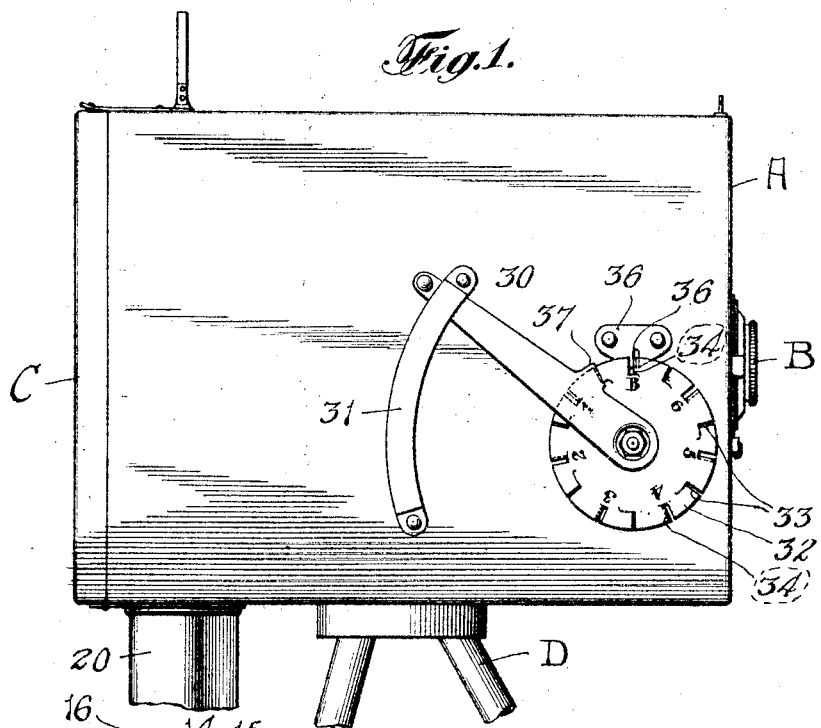

Specifically describing the present embodiment of the invention, the reference character A designates the casing of the camera which may be of any suitable construction, preferably rectangular in configuration, and having at one end the lens and shutter actuating mechanism B of known construction. Preferably, the opposite end of the camera is provided with a removable cover C to permit access to the interior of the camera, particularly for inserting sensitized cards or films. The camera may or may not be constructed for mounting upon a tripod or other support D, as may be desired.

One important feature of the invention is the card or film holder E for holding a plurality of cards or films F in packed or superposed relation, both for transporting or shipping purposes and for supporting the cards or films in proper relation to the lens of the camera. This case or holder is shown as comprising a box-like body 1 which may be formed of metal having one end thereof open, as at 2. The edges of the longitudinal sides of the body 1 are inturned, as at 3, and the end of the body opposite the open end 2 is formed with a plurality of spaced inturned tongues 4. The cards or films F may thus be arranged in packed relation and slipped longitudinally into the body through the open end 2, the inturned flanges 3 and tongues 4 preventing displacement of the cards through the open top of the box. For maintaining the cards or films in closely packed relation and in engagement with the flanges 3 and tongues 4, a follower plate 5 having spring tongues 6 is interposed between the bottom card and the bottom of the box 1, as clearly shown in Figures 2 and 9. In packing the films for shipment or sale, an opaque card or plate is placed at the top of the pack to close the open side of the box and exclude light from the films, light being excluded from the films at the open end of the box by the tightly packed relation of the cards or films. When the cards are packed in the box 1, the edges of the top card are exposed between the tongues 4 for cooperation with a card ejecting mechanism hereinafter described.

The card holder E is removably supported within the camera in proper relation to the lens, preferably by a frame which comprises two spaced and parallel side pieces 7 secured at their ends, as at 8, to the top and bottom of the camera casing. A transverse card holder supporting bar 9 is fixedly secured to and between the side pieces 7, as clearly shown in Figures 2 and 7. Each of the side pieces 7 is also formed at its longitudinal edge next to the lens with spaced and parallel inturned flanges 10 and 11 against which the front of the card holder E is adapted to abut. The card holder is applied to the camera by placing the open end 2 thereof upon the transverse bar 9 with the front of the box 1 bearing against the flanges 10. The card holder E and the bar 9 are so related that the lower edge of the top card F in the holder projects beyond the corresponding edge of the bar, as clearly shown in Figure 2, and preferably the opposite edge of the bar 9 is provided with ears 12 for holding the lower edge of the card holder against rearward displacement.

Figure 2:
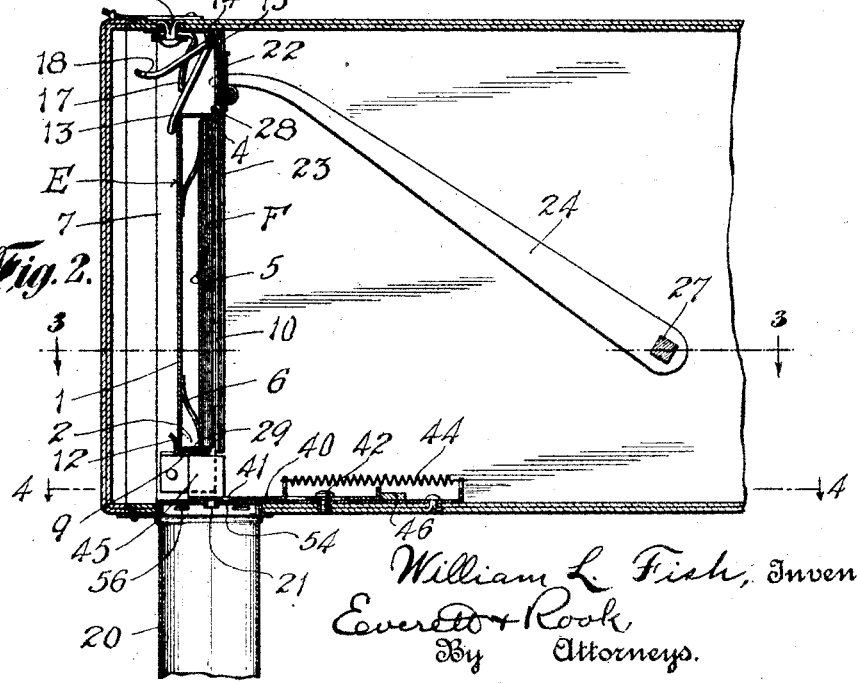
Figure 2 is a vertical longitudinal sectional view through the camera with portions broken away to eliminate unnecessary details.

The upper end of the card holder E is preferably held against rearward movement by releasable clamping mechanism, which may include a pair of arms 13 pivotally connected to ears 14 stamped up from a bracket 15 fixedly secured to the top of the camera casing by any suitable means, such as the rivet 16. The arms 13 may be resiliently held in contact with the card holder E by means of a spring 17 also secured to the casing by the rivet 16. For releasing the arms 13 from the card holder, I may provide a finger piece 18. One convenient manner of constructing the arms 13 and finger piece 18 is to form them of a single piece of rod or heavy wire bent to the required shape, as clearly shown in Figure 7. The ends of the rod may also be pivotally mounted in the side pieces 7, as indicated at 19. Obviously, to place a card holder E in the camera, the finger piece 18 is lifted upwardly to swing the arms 13 in the same direction, after which the open end of the card holder is placed upon the bar 9 and the holder pressed against the flanges 11. The finger piece 18 is then released, whereupon the spring 17 forces the arms 13 against the card holder, as shown in Figure 2.

In accordance with the invention, the cards F are separately ejected from the card holder E into a developing tank. As shown on the drawings, a tank 20 of any desired configuration but preferably diamond shape in cross-section, is removably secured to the bottom of the camera casing and has a card-receiving opening 21 disposed directly beneath the lower edge of the top card F in the holder E, and the top card of the pack is pushed edgewise from the holder E through the receiving opening 21 by means of a card ejector 22 slidably mounted in opposite vertical guideways 23 formed by the flanges 10 and 11 and actuated by arms 24 passing through slots 25 in the ends of the ejector and bearing upon rollers 26, the said arms 24 being fixedly connected to a shaft 27 journaled transversely of the camera casing in any suitable manner. The ejector 22 is formed at its edge adjacent the card holder with a plurality of lugs 28 disposed in substantial registry with the spaces between the tongues 4 on the card holder box 1. The card ejector 22 is normally positioned above the top of the card holder E, as shown in Figure 2, and obviously when the shaft 27 is rotated in one direction, the ejector will be slid downwardly in the guideways 23 so that the lugs 28 engage the upper edge of the top card F, whereby said card is forced edgewise from the card holder and through the receiving opening 21 of the developing tank. Upon rotation of the shaft in the opposite direction, the card ejector 22 is returned to its normal position. To prevent more than one card from being ejected at one time, a rubber seat 29 is secured to the bar 9 so that its edge slightly overlies the lower edge of the top card in the card holder E and frictionally engages the rear side of said card with a wiping action to prevent the next adjacent card from moving with the top card.

Any suitable means may be utilized for rotating the shaft 27, but in the present instance I have shown the shaft projecting through the side wall of the camera casing and having fixedly connected thereto an operating lever 30, oscillation of which is limited by means of a segmental stop plate 31.

It is desirable to provide means exteriorly of the camera casing to indicate the number of cards which have been exposed and ejected into the developing tank, so that the operator may know when the supply of cards or films in the holder E becomes exhausted. For this purpose, I have provided a dial plate 32 fixedly connected to the operating lever 30 and having a series of spring tongues 33 stamped up and projecting from one side thereof, and another series of spring tongues 34 stamped up and projecting from the opposite side of the plate. The tongues 34 are adapted to spring into and out of a notch 35 in a stop plate 36, while the tongues 33 are arranged to cooperate with a lug 37 on the operating lever 30. The tongues 33 and 34 are alternately arranged circumferentially of the plate 32, and one of the tongues 34 is normally positioned within the notch 35. Upon movement of the operating lever 30 to rotate the shaft 27 in the direction to eject a card from the holder E, the dial plate 32 is held against rotation by the tongue 34 in the slot 35 and the lug 37 slips over the tongues 33. When the lever 30 is moved in the opposite direction, the lug 37 positively engages one of the tongues 33 and forcibly dislodges the tongue 34 from the notch 35 and rotates the dial plate 32 until the next adjacent tongue 34 snaps into the notch 35. The tongues 33 and 34 are so spaced on the plate 32 that the said plate is rotated a distance equal to the distance between the tongues 34, and preferably there are a number of tongues 34 corresponding to the number of cards F in the holder E when the latter is full. The tongues 34 may be numbered, as indicated at 38, so that the number on the tongue 34 which is positioned on the notch 35 will indicate the number of cards which have been exposed and ejected from the holder E.

It is desirable to provide means for normally closing the receiving opening 21 of the developing tank 20 so that light may not enter the camera and destroy the top card when the developing tank 20 is removed. Accordingly, I may provide a closure slide 40 having a slot 41 adapted to register with the receiving opening 21, said slide being mounted by a screw and slot connection 42 on a bearing plate 43 secured to the bottom of the camera casing. The closure slide 40 is normally positioned to close the receiving opening 21, as shown in Figure 2, by a tension spring 44, and the slide is formed with upwardly projecting arms 45 to bear against the underside of the transverse card holder support to prevent the slide from moving laterally away from the receiving opening 21 of the tank 20 so as to permit light to enter the camera. A bell crank lever 46 is pivotally mounted at 47 on the bearing plate 43 with one arm in contact with one end of the cover slide 40 and the other arm in contact with an actuating rod 48. The rod 48 is slidably mounted in bearings 49 and 50 carried by the bearing plate 43 and secured to the camera casing, respectively, and one edge of the rod 48 is formed with a notch 51 to cooperate with an arm 460 of the bell crank lever 46 which is in contact with the rod 48. One of the ejector operating arms 24 is provided with a lateral projection 52 having a pin and slot connection 53 with one end of the actuating rod 48, as shown in Figures 3, 4 and 5. Obviously, the bell crank lever 46 will be influenced to maintain contact with the actuating rod 48 by the spring 44, and when the card ejector 22 is at its normal position, the arm 460 of the bell crank lever is in engagement with the notch 51, and the closure slide 40 closes the receiving opening 21 of the developing tank 20. As the shaft 27 is rotated to eject a card from the holder E, the actuating rod 48 is longitudinally moved in the direction of the arrow on Figure 3, whereby the arm 460 of the bell crank lever 46 is forced out of the notch 51 so as to oscillate the lever 46 and push the closure slide 40 against the influence of the spring 44 to open the developing tank receiving opening 21, as shown in Figure 4. Upon rotation of the shaft 27 in the direction to return the card ejector 22 to its normal position, the actuating rod 48 is moved in the opposite direction to that above described, whereupon the arm 460 of the bell crank lever 46 again snaps into the notch 51 under the influence of the spring 44 which also returns the closure slide 40 to its closed position, as shown in Figures 2 and 3. It will be noted that this particular construction provides for opening operation of the closure slide 40 in just sufficient time to accommodate the ejected card F, so that a minimum distance of movement for the ejected card is possible and a minimum of space required for arrangement of the parts.

The developing tank 20 may be detachably connected to the camera casing in any suitable manner, but in the present instance I have shown a plate 54 fixedly secured in the bottom of the camera casing to receive the open end of the developing tank 20, said frame having projections or recesses 55 to cooperate with recesses or projections 56, respectively, for securing the tank 20 to the camera, and having the card receiving opening 21 therein.

While I have shown and described a camera embodying certain details of construction, it will be understood that this is primarily for the purpose of illustrating the principles of the invention, and that many modifications and changes may be made in the details of construction of the device without departing from the spirit or scope of the invention. Therefore, I do not desire to be understood as limiting myself except as required by the following claims when construed in the light of the prior art.

Having thus described the invention, what I claim is:

1. In a camera, the combination with a casing having a lens, of a frame within said casing comprising a pair of spaced and parallel side pieces each having an inturned flange at its longitudinal edge adjacent said lens and a transverse bar, a holder for releasably supporting a light sensitive card, film or plate opposite said lens so that said card is movable edgewise from said holder, said holder being removably supported on said transverse bar of said frame and bearing against said flanges, releasable means for holding said card holder against said flanges, a receptacle for developing liquid to receive said card directly from said holder, and an ejector operable from the exterior of said casing to engage one edge of said card film or plate and slide it edgewise from said holder into said receptacle.

2. In a camera, the combination with a casing having a lens, of a holder for releasably supporting a light sensitive card, film or plate within said casing opposite said lens so that said card is movable edgewise from said holder, a frame for removably supporting said holder comprising a pair of spaced and parallel side pieces each having at its longitudinal edge a pair of spaced and parallel flanges, a receptacle to receive said card or film edgewise directly from said holder, an ejector to engage one edge of said card or film and movable in guideways formed by said spaced flanges, and means operable from the exterior of said casing for actuating said ejector to slide said card or film from said holder into said receptacle.

3. In a camera, the combination with a casing having a lens, of a holder for releasably supporting a light sensitive card, film or plate within said casing opposite said lens so that said card is movable edgewise from said holder, a receptacle to receive said card or film edgewise directly from said holder, guideways disposed at opposite sides of said holder, an ejector movable in said guideways to engage one edge of said card or film, a rotatable shaft journaled within said casing, a pair of arms on said shaft operatively connected to said ejector to move the same in said guideways upon rotation of said shaft, and means exterior of said casing for rotating said shaft.

4. In a camera, the combination with a casing having a lens, of a holder for a pack of light sensitive films or cards comprising a box having an open top with inturned flanges at two opposite edges and at one end with the opposite end open, and a spring follower interposed between the bottom of said box and the bottom card or film of said pack to normally influence said cards or films toward said flanges, the first-mentioned end of said box being formed with notches to expose the corresponding edge of the top card or film, a receptacle to receive said cards or films one at a time edgewise directly from the open end of said box, means for sliding said cards from said holder one at a time into said receptacle including a part to enter said notches and engage the edge of the top card or film, and means for operating the last-mentioned means from the exterior of said casing.

5. In a camera, the combination with a casing having a lens, of a holder for releasably supporting a light sensitive medium within said casing opposite said lens, a receptacle secured to said casing exteriorly thereof to receive said sensitive medium direct from said holder, said casing having an opening communicating with said receptacle, means operable from the exterior of said casing for removing said medium from said holder and depositing it in said receptacle, and means for normally closing said opening in said casing and operable automatically to open said opening substantially simultaneously with the removal of said sensitive medium from said holder.

6. In a camera, the combination with a casing having a lens, of a holder for releasably supporting a plurality of light sensitive cards or films in packed relation within said camera opposite said lens so that said cards or films are movable edgewise from said holder, a receptacle secured to said casing exteriorly thereof to receive said cards or films, said casing having an opening communicating with said receptacle to direct said cards or films edgewise one at a time into said receptacle, means operable from the exterior of said casing for sliding said cards or films edgewise one at a time from said holder into said receptacle, and means for normally closing said opening in said casing and operable automatically to open said opening substantially simultaneously with the removal of said sensitive medium from said holder.

7. In a camera, the combination with a casing having a lens, of a holder for releasably supporting a light sensitive card or film within said casing opposite said lens so that said card is movable edgewise from said holder, a receptacle secured to said casing exteriorly thereof to receive said cards or films, said casing having an opening communicating with said receptacle to direct said cards or films edgewise one at a time into said receptacle, guideways disposed at opposite sides of said holder, an ejector movable in said guideways to engage one edge of said card or film, a rotatable shaft journaled within said casing, a pair of arms on said shaft operatively connected to said ejector to move the same in said guideways upon rotation of said shaft, means exterior of said casing for rotating said shaft, means normally closing said opening in said casing, and an operative connection between said closing means and said shaft for opening said closing means substantially simultaneously with the ejection of said card or film from said holder.

8. A holder for a pack of light sensitive films or cards comprising a box having an open top with inturned flanges at two opposite edges and at one end with the opposite end open, and a spring follower interposed between the bottom of said box and the bottom card or film of said pack to normally influence said cards or films toward said flanges, the first-mentioned end of said box being formed with notches to expose the corresponding edge of the top card or film.

9. In a camera, the combination with a casing having a lens, of a holder for releasably supporting a light sensitive medium within said casing opposite said lens, a receptacle secured to said casing exteriorly thereof to receive said sensitive medium direct from said holder, said casing having an opening communicating with said receptacle, means operable from the exterior of said casing for removing said medium from said holder and depositing it in said receptacle, a closure slide for closing said opening, a spring for normally influencing said slide into position to open said opening means normally holding said slide against movement under influence of said spring, and means operable automatically substantially simultaneously with the removal of said sensitive medium from said holder to release said holding means.

10. In a camera, the combination with a casing having a lens, of a holder for releasably supporting a light sensitive card or film within said casing opposite said lens so that said card is movable edgewise from said holder, a receptacle secured to said casing exteriorly thereof to receive said cards or films, said casing having an opening communicating with said receptacle to direct said cards or films edgewise one at a time into said receptacle, guideways disposed at opposite sides of said holder, an ejector movable in said guideways to engage one edge of said card or film, a rotatable shaft journaled within said casing, a pair of arms on said shaft operatively connected to said ejector to move the same in said guideways upon rotation of said shaft, means exterior of said casing for rotating said shaft, a closure slide for closing said opening, a spring for normally influencing said slide into position to open said opening, means normally holding said slide against movement under influence of said spring, and an operative connection between the last-mentioned means and said shaft to actuate said last-mentioned means to release said closure slide into open position substantially simultaneously with the ejection of said card or film from said holder.

WILLIAM LAFAYETTE FISH.